United States Patent
Nam et al.

(10) Patent No.: US 11,746,173 B2
(45) Date of Patent: Sep. 5, 2023

(54) CORE-SHELL COPOLYMER AND RESIN COMPOSITION CONTAINING SAME

(71) Applicant: LG Chem, Ltd., Seoul (KR)

(72) Inventors: Sang Il Nam, Daejeon (KR); Ki Hyun Yoo, Daejeon (KR); Yoon Ho Kim, Daejeon (KR)

(73) Assignee: LG Chem, Ltd.

( * ) Notice: Subject to any disclaimer, the term of this patent is extended or adjusted under 35 U.S.C. 154(b) by 138 days.

(21) Appl. No.: 17/423,360

(22) PCT Filed: Aug. 18, 2020

(86) PCT No.: PCT/KR2020/010947
§ 371 (c)(1),
(2) Date: Jul. 15, 2021

(87) PCT Pub. No.: WO2021/060709
PCT Pub. Date: Apr. 1, 2021

(65) Prior Publication Data
US 2022/0127401 A1    Apr. 28, 2022

(30) Foreign Application Priority Data

Sep. 26, 2019 (KR) .................. 10-2019-0118625
Jul. 10, 2020 (KR) .................. 10-2020-0085311

(51) Int. Cl.
C08L 51/04     (2006.01)
C08F 236/10    (2006.01)
C08F 279/06    (2006.01)
C08L 27/06     (2006.01)

(52) U.S. Cl.
CPC .......... *C08F 236/10* (2013.01); *C08F 279/06* (2013.01); *C08L 27/06* (2013.01); *C08L 2207/53* (2013.01)

(58) Field of Classification Search
CPC .... C08F 236/10; C08F 279/06; C08F 236/06; C08F 279/02; C08F 279/04; C08L 27/06; C08L 2207/53; C08L 2310/00; C08L 2201/08; C08L 51/04
USPC ........................................................ 523/201
See application file for complete search history.

(56) References Cited

U.S. PATENT DOCUMENTS

| | | | |
|---|---|---|---|
| 3,845,164 | A | 10/1974 | Goto et al. |
| 2007/0043167 | A1 | 2/2007 | Kim et al. |
| 2007/0287799 | A1 | 12/2007 | Ha et al. |
| 2008/0207830 | A1 | 8/2008 | Weber et al. |
| 2010/0048816 | A1 | 2/2010 | Ryu et al. |
| 2019/0185605 | A1 | 6/2019 | Nam et al. |
| 2021/0221982 | A1 | 7/2021 | Zhang et al. |

FOREIGN PATENT DOCUMENTS

| | | |
|---|---|---|
| CN | 109929076 A | 6/2019 |
| JP | 2002256037 A | 9/2002 |
| JP | 2014162878 A | 9/2014 |
| KR | 20070021894 A | 2/2007 |
| KR | 100815995 B1 | 3/2008 |
| KR | 20080068037 A | 7/2008 |
| KR | 101101092 B1 | 12/2011 |
| KR | 20140099350 A | 8/2014 |
| KR | 20160081497 A | 7/2016 |
| KR | 20180033653 A | 4/2018 |
| KR | 20190012683 A | 2/2019 |
| KR | 20190034783 A | 4/2019 |
| KR | 20190084549 A | 7/2019 |

OTHER PUBLICATIONS

Extended European Search Report including Written Opinion for Application No. 20869461.2 dated Mar. 14, 2022, pp. 1-5.
International Search Report for Application No. PCT/KR2020/010947, dated Nov. 26, 2020, 3 pages.
Search Report dated Feb. 20, 2023 from the Office Action for Chinese Application No. 202080009226.1 dated Feb. 23, 2023, pp. 1-2. [See p. 1, categorizing the cited references].

*Primary Examiner* — Hannah J Pak
(74) *Attorney, Agent, or Firm* — Lerner David LLP

(57) ABSTRACT

Provided is a core-shell copolymer, and in particular, a core-shell copolymer including a core and a shell surrounding the core, wherein the core includes a conjugated diene monomer-derived repeating unit, an aromatic vinyl monomer-derived repeating unit, and an aromatic (meth)acrylate monomer-derived repeating unit, the shell includes an alkyl (meth)acrylate monomer-derived repeating unit, an aromatic vinyl monomer-derived repeating unit, and an aromatic (meth)acrylate monomer-derived repeating unit, the core has a particle size of 800 Å to 900 Å, the core-shell copolymer has a particle size of 900 Å to 1000 Å, the core has a refractive index of 1.5355 to 1.5425, and the core-shell copolymer has a refractive index of 1.5415 to 1.5440.

8 Claims, No Drawings

CORE-SHELL COPOLYMER AND RESIN COMPOSITION CONTAINING SAME

CROSS-REFERENCE TO RELATED APPLICATIONS

The present application is a national stage entry of International Application No. PCT/KR2020/010947, filed on Aug. 18, 2020, which claims priority to Korean Patent Application No. 10-2019-0118625, filed on Sep. 26, 2019 and Korean Patent Application No. 10-2020-0085311, filed on Jul. 10, 2020, the entire contents of which are incorporated herein by reference.

TECHNICAL FIELD

The present invention relates to a core-shell copolymer, and more particularly, to a core-shell copolymer and a resin composition comprising the same.

BACKGROUND ART

A polyvinyl chloride (PVC) resin is inexpensive and allows easy adjustment of hardness to thereby have various application fields, and has excellent physical properties and chemical properties to thereby be widely used in various fields. The polyvinyl chloride resin may be mixed and molded with various additives in order to complement various physical properties including an impact resistance of the polyvinyl chloride resin, rather than being used alone when a product is molded.

As such, in order to solve a problem of reducing an impact strength, the polyvinyl chloride resin has been used together with appropriately selected additives such as an impact modifier, a processing aid, a stabilizer, and a filler. Among them, as an impact modifier for the polyvinyl chloride resin, a butadiene impact modifier such as a methacrylate butadiene styene (MBS) impact modifier and an acrylonitrile butadiene styrene (ABS) impact modifier, a chlorinated polyethylene (CPE) impact modifier, and a silicone impact modifier, etc., have been generally used. In particular, among the butadiene impact modifiers, the MBS impact modifier has been mainly used. For example, a film manufactured by mixing the PVC resin with the impact modifier has been used for packaging a finished product or for a transparent decorative sheet product, etc. However, when a product manufactured from a PVC film including the impact modifier is folded or is subjected to external force, a whitening phenomenon that turns white occurs. Customers are increasing their demands for improvement on the whitening phenomenon, and thus, researches on the whitening phenomenon are being actively conducted.

In addition, the PVC resin is a recyclable product and causes a problem due to a decrease in a thermal stability that occurs in reprocessing. Thus, research and development to improve a thermal stability along with the whitening phenomenon are continuously required.

DISCLOSURE

Technical Problem

An object of the present invention is to provide a core-shell copolymer in which an aromatic vinyl monomer-derived repeating unit and an aromatic (meth)acrylate monomer-derived repeating unit are introduced as a core component and a shell component to control particle sizes and refractive indexes of the core and the core-shell copolymer, such that an impact strength, a haze property, and a thermal stability of a molded article manufactured from a polyvinyl resin composition comprising the core-shell copolymer may be simultaneously improved.

Technical Solution

In one general aspect, there is provided a core-shell copolymer including a core and a shell surrounding the core, wherein the core includes a conjugated diene monomer-derived repeating unit, an aromatic vinyl monomer-derived repeating unit, and an aromatic (meth)acrylate monomer-derived repeating unit, the shell includes an alkyl (meth)acrylate monomer-derived repeating unit, an aromatic vinyl monomer-derived repeating unit, and an aromatic (meth)acrylate monomer-derived repeating unit, the core has a particle size of 800 Å to 900 Å, the core-shell copolymer has a particle size of 900 Å to 1000 Å, the core has a refractive index of 1.5355 to 1.5425, and the core-shell copolymer has a refractive index of 1.5415 to 1.5440.

In another general aspect, there is provided a resin composition comprising the core-shell copolymer and a vinyl chloride polymer.

Advantageous Effects

In a core-shell copolymer according to the present invention, an aromatic vinyl monomer-derived repeating unit and an aromatic (meth)acrylate monomer-derived repeating unit are introduced as a core component and a shell component to control particle sizes and refractive indexes of the core and the core-shell copolymer, such that an impact strength, a haze property, and a thermal stability of a molded article manufactured from a polyvinyl resin composition comprising the core-shell copolymer may be simultaneously improved.

BEST MODE

The terms and words used in the detailed description and claims should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

Hereinafter, the present invention will be described in more detail to assist in understanding the technical idea of the present invention.

The term "monomer-derived repeating unit" used herein may refer to a component, a structure, or a material itself resulting from the monomer, and may refer to a repeating unit in which the added monomer participates in the polymerization reaction and is formed in the polymer during the polymerization of the polymer.

The term "core" used herein may refer to a polymer component or a copolymer component in which a monomer forming a core is polymerized to form a core or a core layer of a core-shell copolymer.

The term "shell" used herein may refer to a polymer component or copolymer component in which a monomer forming a shell is graft polymerized on the core of the core-shell copolymer to form a shell or shell layer of the core-shell copolymer that exhibits a form in which the shell surrounds the core.

The term "(meth)acrylate" used herein may refer to acrylate or methacrylate.

The term "latex" used herein may refer to a polymer or copolymer polymerized by polymerization, which is present in a form dispersed in water, and as a specific example thereof, may refer to a particulate of a rubbery polymer or rubbery copolymer polymerized by emulsion polymerization, which is present in a form dispersed in water as a colloidal state.

According to the present invention, there is provided a core-shell copolymer. In a core-shell copolymer including a core and a shell surrounding the core, the core includes a conjugated diene monomer-derived repeating unit, an aromatic vinyl monomer-derived repeating unit, and an aromatic (meth)acrylate monomer-derived repeating unit, the shell includes an alkyl (meth)acrylate monomer-derived repeating unit, an aromatic vinyl monomer-derived repeating unit, and an aromatic (meth)acrylate monomer-derived repeating unit, the core has a particle size of 800 Å to 900 Å, the core-shell copolymer has a particle size of 900 Å to 1000 Å, the core has a refractive index of 1.5355 to 1.5425, and the core-shell copolymer has a refractive index of 1.5415 to 1.5440.

As described above, in the core-shell copolymer, an aromatic vinyl monomer-derived repeating unit and an aromatic (meth)acrylate monomer-derived repeating unit are introduced as the core component and shell component to control particle sizes and refractive indexes of the core and the core-shell copolymer in the above range, such that an impact strength, a haze property, and a thermal stability of a molded article manufactured from a polyvinyl resin composition comprising the core-shell copolymer may be simultaneously improved.

According to an exemplary embodiment of the present invention, the core may be a core polymer forming the core of the core-shell copolymer, and a specific example thereof may include a conjugated diene monomer-derived repeating unit, an aromatic vinyl monomer-derived repeating unit, and an aromatic (meth)acrylate monomer-derived repeating unit. The shell may be a shell polymer grafted on the core polymer to surround the core, and a specific example thereof may include a methyl (meth)acrylate monomer-derived repeating unit, an aromatic vinyl monomer-derived repeating unit, and an aromatic (meth)acrylate monomer-derived repeating unit.

According to an exemplary embodiment of the present invention, the conjugated diene monomer that forms the conjugated diene monomer-derived repeating unit included in the core, may include at least one selected from the group consisting of 1,3-butadiene, 2,3-dimethyl-1,3-butadiene, piperylene, 3-butyl-1,3-octadiene, isoprene, and 2-phenyl-1,3-butadiene.

A content of the conjugated diene monomer-derived repeating unit included in the core may be 60 parts by weight to 85 parts by weight based on 100 parts by weight of the total core. For example, the content of the conjugated diene monomer-derived repeating unit included in the core may be 65 parts by weight to 83 parts by weight, 65 parts by weight to 81 parts by weight, or 65 parts by weight to 79 parts by weight based on 100 parts by weight of the total core. In this case, a molded article manufactured from a resin composition comprising the core-shell copolymer may have an excellent impact resistance.

According to an exemplary embodiment of the present invention, the aromatic vinyl monomer that forms the aromatic vinyl monomer-derived repeating unit included in the core, may include at least one selected from the group consisting of styrene, alpha-methyl styrene, 3-methyl styrene, 4-methyl styrene, 4-propyl styrene, isopropenyl naphthalene, 1-vinylnaphthalene, styrene substituted with an alkyl group having 1 to 3 carbon atoms, 4-cyclohexylstyrene, 4-(p-methylphenyl)styrene, and styrene substituted with halogen. A specific example of the aromatic vinyl monomer may include alpha-methylstyrene represented by the following formula 1:

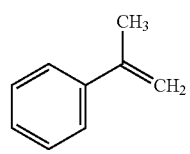

[Formula 1]

A content of the aromatic vinyl monomer-derived repeating unit included in the core, may be 4 parts by weight to 20 parts by weight based on 100 parts by weight of the total core. In this range, compatibility is imparted between a polyvinyl chloride resin and the core, and a refractive index is as high as 1.5350 to 1.5420, such that when the core-shell copolymer including the aromatic vinyl monomer-derived repeating unit is used as an impact modifier, a thermal stability and a transparency of a thermoplastic resin may be improved For example, the aromatic vinyl monomer-derived-repeating unit may have a refractive index of 1.5360 to 1.5410, 1.5370 to 1.5400, or 1.5380 to 1.5400.

According to an exemplary embodiment of the present invention, the aromatic (meth)acrylate monomer that forms the aromatic (meth)acrylate monomer-derived repeating unit included in the core, may include at least one selected from the group consisting of biphenylmethyl acrylate and phenoxy benzyl acrylate. A specific example of the aromatic (meth)acrylate monomer may include biphenylmethyl acrylate represented by the following Formula 2:

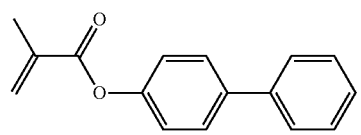

[Formula 2]

A content of the aromatic (meth)acrylate monomer-derived repeating unit included in the core may be 4 parts by weight to 27 parts by weight, 4 parts by weight to 25 parts by weight, or 4 parts by weight to 20 parts by weight based on 100 parts by weight of the total core. In this range, compatibility is imparted between the polyvinyl chloride resin and the core, and a refractive index is as high as 1.5950 to 1.6100, such that when the core-shell copolymer including the aromatic (meth)acrylate monomer-derived repeating unit is used as an impact modifier, a thermal stability, a transparency, and a haze property of a thermoplastic resin may be improved. For example, the aromatic (meth)acrylate monomer-derived repeating unit may have a refractive index of 1.5960 to 1.6090, 1.5980 to 1.6050, or 1.5980 to 1.6020.

According to an exemplary embodiment of the present invention, a weight ratio of the aromatic vinyl monomer-derived repeating unit and the aromatic (meth)acrylate monomer-derived repeating unit included in the core may be 1:0.2 to 1:5. For example, the weight ratio of the aromatic vinyl monomer-derived repeating unit and the aromatic (meth)acrylate monomer-derived repeating unit included in the core may be 1:0.23 to 1:5, 1:0.25 to 1:4.5, or 1:0.25 to 1:4. In forming the core, the aromatic vinyl monomer-derived repeating unit and the aromatic (meth)acrylate monomer-derived repeating unit are included in an amount in the above range, such that the refractive index of the core may be controlled from 1.5355 to 1.5425.

According to an exemplary embodiment of the present invention, the core may further include a crosslinkable monomer-derived repeating unit, in addition to the conjugated diene monomer-derived repeating unit. In this case, polymerization reactivity may be improved during the formation of the shell by graft, including core polymerization. The crosslinkable monomer may include at least one selected from the group consisting of a (meth)acrylic crosslinkable monomer such as ethylene glycol di(meth)acrylate, 1,6-hexanediol di(meth)acrylate, allyl(meth)acrylate, trimethylolpropane tri(meth)acrylate, and pentaerythritol tetra (meth)acrylate; and a vinyl crosslinkable monomer such as divinylbenzene, divinylnaphthalene, and diallyl phthalate.

According to an exemplary embodiment of the present invention, a content of the crosslinkable monomer-derived repeating unit included in the core may be 0.1 parts by weight to 1 part by weight based on 100 parts by weight of the total core. For example, the content of the crosslinkable monomer-derived repeating unit may be 0.1 parts by weight to 0.8 parts by weight, 0.2 parts by weight to 0.8 parts by weight, or 0.3 parts by weight to 0.7 parts by weight based on 100 parts by weight of the total core. In this range, polymerization productivity may be excellent.

According to an exemplary embodiment of the present invention, the core may have a particle size of 800 Å to 900 Å. The particle size of the core may be controlled by adjusting an amount of added emulsifier and a concentration of an electrolyte when the core is prepared. Specifically, when the core is prepared, increasing the amount of added emulsifier may reduce a particle size of the core, and increasing the concentration of the electrolyte may increase a particle size of the core. In the present invention, the amount of added emulsifier and the concentration of the electrolyte are adjusted, such that the particle size of the core may be controlled from 800 Å to 900 Å. Accordingly, an impact strength, a transparency, and a thermal stability of a molded article molded with a resin composition comprising the core-shell copolymer having the particle size of the core satisfying the above range may be simultaneously improved.

According to an exemplary embodiment of the present invention, the core may have a refractive index of 1.5355 to 1.5425. As described above, mixed aromatic vinyl monomer-derived repeating unit and aromatic (meth)acrylate monomer-derived repeating unit are used as a material forming the core, such that the core may have a refractive index in the above range, may exhibit a high strength property and have an improved heat resistance as an alkyl groups included in the aromatic ring are oriented in one direction, and may have an improved surface adhesion with the polyvinyl chloride resin by forming an entanglement structure due to the alkyl (meth)acrylate.

According to an exemplary embodiment of the present invention, the alkyl (meth)acrylate monomer that forms the alkyl (meth)acrylate monomer-derived repeating unit included in the shell may be an alkyl (meth)acrylate monomer having 1 to 8 carbon atoms. For example, the alkyl (meth)acrylate monomer may include at least one selected the group consisting of methyl (meth)acrylate, ethyl (meth) acrylate, propyl (meth)acrylate, butyl (meth)acrylate, pentyl (meth)acrylate, hexyl (meth)acrylate, heptyl (meth)acrylate, octyl (meth)acrylate, and 2-ethylhexyl (meth)acrylate. In this case, a molded article manufactured from a resin composition comprising the core-shell copolymer may have excellent impact resistance.

A content of the alkyl (meth)acrylate monomer-derived repeating unit included in the shell may be 10 parts by weight to 35 parts by weight, 10 parts by weight to 30 parts by weight, or 10 parts by weight to 20 parts by weight based on the 100 parts by weight of the total core-shell copolymer. In this range, a molded article manufactured from a resin composition comprising the core-shell copolymer may have excellent impact resistance, surface property, and heat resistance.

The description of an aromatic vinyl monomer-derived repeating unit and an aromatic (meth)acrylate monomer-derived repeating unit included in the shell may be the same as that of the aromatic vinyl monomer-derived repeating unit and the aromatic (meth)acrylate monomer-derived repeating unit included in the core.

A content of the aromatic vinyl monomer-derived repeating unit included in the shell may be 5 parts by weight to 20 parts by weight, 5 parts by weight to 18 parts by weight, or 5 parts by weight to 17 parts by weight based on the 100 parts by weight of the total core-shell copolymer.

The content of the aromatic (meth)acrylate monomer-derived repeating unit included in the shell may be 5 parts by weight to 20 parts by weight, 5 parts by weight to 18 parts by weight, or 5 parts by weight to 17 parts by weight based on the 100 parts by weight of the total core-shell copolymer.

According to an exemplary embodiment of the present invention, a weight ratio of the aromatic vinyl monomer-derived repeating unit and the aromatic (meth)acrylate monomer-derived repeating unit included in the shell may be 1:0.25 to 1:3.5. For example, the weight ratio of the aromatic vinyl monomer-derived repeating unit and the aromatic (meth)acrylate monomer-derived repeating unit included in the shell may be 1:0.27 to 1:3.5, 1:0.27 to 1:3.3, or 1:0.3 to 1:3.3. In forming the shell, the aromatic vinyl monomer-derived repeating unit and the aromatic (meth) acrylate monomer-derived repeating unit are included in an amount in the above range, such that a refractive index of the core-shell copolymer may be controlled from 1.5415 to 1.5440.

According to an exemplary embodiment of the present invention, the core-shell copolymer may have a refractive index of 1.5415 to 1.5440. As described above, mixed aromatic vinyl monomer-derived repeating unit and aromatic (meth)acrylate monomer-derived repeating unit are used as a material forming the core and the shell, such that the core-shell copolymer may simultaneously improve a processability, a transparency, a thermal stability, and an impact strength by having a refractive index in the above range and an improved heat resistance as an alkyl groups included in the aromatic ring are oriented in one direction, and forming a structure sufficiently enclosing the core due to the alkyl, thereby improving thermal stability.

According to an exemplary embodiment of the present invention, the core-shell copolymer may have a particle size of 900 Å to 1000 Å. The particle size of the core-shell copolymer may be controlled depending on the particle size of the core. Specifically, in the present invention, the core is formed to have a particle size of 800 Å to 900 Å, such that that the particle size of the core-shell copolymer may be controlled from 900 Å to 1000 Å. Thus, an impact strength, a transparency, and a thermal stability of a molded article molded from a resin composition comprising the core-shell copolymer may be simultaneously improved.

According to an exemplary embodiment of the present invention, the content of the core may be 40 wt. % to 95 wt. %, 50 wt. % to 90 wt. %, or 60 wt. % to 80 wt. % based on the total content of the core-shell copolymer, the content of the shell may be 5 wt. % to 60 wt. %, 10 wt. % to 50 wt. %, or 20 wt. % to 40 wt. % based on the total content of the core-shell copolymer. In these ranges, a molded article manufactured from a resin composition comprising the core-shell copolymer may have an excellent impact resistance and an excellent balance between physical properties.

According to the present invention, there is provided a method of preparing the core-shell copolymer. A method of preparing the core-shell copolymer may include: preparing a core polymer by polymerizing a monomer mixture for forming a core (S10); and preparing a core-shell copolymer by emulsion polymerization of a monomer mixture for forming a shell, in the presence of the core polymer prepared in the step (S10).

According to an exemplary embodiment of the present invention, the polymerization of the step (S10) and the step (S20) may be carried out by radical polymerization using a peroxide initiator, a redox initiator, or an azo initiator, in the presence of the monomer mixture for forming a core and the monomer mixture for forming a shell, respectively, and may be carried out by an emulsion polymerization method.

According to an exemplary embodiment of the present invention, the step (S10) is a step for polymerizing a core polymer for forming a core included in the core-shell copolymer, and may be carried out by emulsion polymerization of the monomer mixture for forming a core.

According to an exemplary embodiment of the present invention, the monomer mixture for forming a core may include the conjugated diene monomer, the aromatic vinyl monomer, and the aromatic (meth)acrylate monomer as described above, and may further include a crosslinkable monomer, if necessary. The type and content of each monomer may be the same as the type of the monomer as described above and the content of the monomer-derived repeating unit as described above.

Meanwhile, according to an exemplary embodiment of the present invention, the emulsion polymerization of the step (S10) may be carried out in the presence of an emulsifier. In this case, the emulsifier may be at least one selected from the group consisting of an anionic emulsifier, a cationic emulsifier, and a nonionic emulsifier. For example, the emulsifier may include at least one selected from the group consisting of an anionic emulsifier widely used in emulsifying polymerization, such as sulfonates, carboxylates, succinates, sulfosuccinates and metal salts thereof, for example, alkylbenzenesulfonic acid, sodium alkylbenzene sulfonate, akylsulfonic acid, sodium alkylsulfonate, sodium polyoxyethylene nonylphenylether sulfonate, sodium stearate, sodium dodecyl sulfate, sodium dodecyl benzene sulfonate, sodium lauryl sulfate, sodium dodecyl sulfosuccinate, potassium olate, and abietinate; a cationic emulsifier in which amine halide, a alkyl tetraammonium salt, an alkylpyridinium salt, etc. are bonded as functional groups of higher aliphatic hydrocarbons; and a nonionic emulsifier such as polyvinyl alcohol and polyoxyethylene nonylphenylether. The emulsifiers may be used in an amount of 0.1 parts by weight to 5 parts by weight based on 100 parts by weight of the total core-shell copolymer.

During the emulsion polymerization, the polymerization may be performed by additionally using additives such as an initiator, a molecular weight regulator, an activator, and a redox catalyst.

The initiator may include, for example, an inorganic peroxide such as sodium persulfate, potassium persulfate, ammonium persulfate, potassium perphosphate, and hydrogen peroxide; an organic peroxide such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxy isobutylate; and a nitrogen compound such as azobis isobutyronitrile, azobis-2,4-dimethylvaleronitrile, azobiscyclohexanecarbonitrile, and azobis methyl isobutyrate. The initiator may be used in an amount of 0.03 parts by weight to 0.2 parts by weight based on 100 parts by weight of the total core-shell copolymer.

The molecular weight regulator may include, for example, mercaptans such as a-methylstyrene dimer, t-dodecyl mercaptan, n-dodecyl mercaptan, and octyl mercaptan; a halogenated hydrocarbon such as carbon tetrachloride, methylene chloride, and methylene bromide; and a sulfur-containing compound such as tetraethyl thiuram disulfide, dipentamethylene thiuram disulfide, and diisopropylxanthogen disulfide. The molecular weight regulator may be used in an amount of 0.1 parts by weight to 3 parts by weight based on 100 parts by weight of the total core-shell copolymer.

The activator may include, for example, at least one selected from the group consisting of sodium hydrosulfite, sodium formaldehyde sulfoxylate, sodium ethylenediamine tetraacetate, ferrous sulfate, lactose, dextrose, sodium linoleate, and sodium sulfate. The activator may be used in an amount of 0.01 parts by weight to 0.15 parts by weight based on 100 parts by weight of the total core-shell copolymer.

The redox catalyst may include, for example, sodium formaldehyde sulfoxylate, ferrous sulfate, disodium ethylenediamine tetraacetate, cupric sulfate, etc. The redox catalyst may be used in an amount of 0.01 parts by weight to 0.1 parts by weight based on 100 parts by weight of the total core-shell copolymer.

According to an exemplary embodiment of the present invention, the polymerization in the step (S10) and the step (S20) may be carried out at a temperature of 50° C. to 150° C., or 50° C. to 130° C., and may be carried out in the presence of various solvents and additives that are commonly used.

In addition, according to an exemplary embodiment of the present invention, the core polymer and the core-shell copolymer prepared in the step (S10) and the step (S20) may be obtained in a form of latex in which the polymer and the copolymer are dispersed in a solvent, respectively. After the production of the core-shell copolymer latex in the step (S20), processes such as agglomeration, aging, dehydration, and drying may be carried out in order to obtain the core-shell copolymer latex including the core-shell copolymer in a form of powder.

In addition, according to the present invention, there is provided a resin composition comprising the core-shell copolymer as an impact modifier. The resin composition may comprise the core-shell copolymer and a vinyl chloride polymer. That is, the resin composition may be a polyvinyl chloride resin composition.

According to an exemplary embodiment of the present invention, the vinyl chloride polymer may be used without limitation as long as it is a vinyl chloride polymer including a vinyl chloride monomer-derived repeating unit, and the resin composition may comprise 1 part by weight to 10 parts by weight or 3 parts by weight to 8 parts by weight of the core-shell copolymer (based on solid content) based on 100 parts by weight of the vinyl chloride polymer. In this range, the molded article manufactured from the resin composition may have improved impact strength, thermal stability, and transparency property.

The resin composition according to the present invention may further include additives such as a stabilizer, a processing aid, a heat stabilizer, a lubricant, a pigment, a dye, and an antioxidant in the range of not reducing its physical properties, if necessary, in addition to the core-shell copolymer and the vinyl chloride polymer.

Hereinafter, the present invention will be described in detail with reference to the following Examples. However, the following examples are intended to be purely exemplary of the invention. It is apparent to those skilled in the art that various changes and modifications can be made within the scope and spirit of the present invention and that the present invention is not limited thereto.

EXAMPLES

Example 1

Preparation of Core-Shell Copolymer>
(1) Preparation of Core
A 120 L high-pressure polymerization vessel equipped with a stirrer was initially charged with 150 parts by weight of ion-exchanged water, 0.5 parts by weight of sodium sulfate, 2.0 parts by weight of potassium oleate, 0.0047 parts by weight of etherenediamine tetrasodium acetate, 0.003 parts by weight of ferrous sulfate, 0.02 parts by weight of sodium formaldehyde sulfoxylate, and 0.1 parts by weight of diisopropylbenzene hydroperoxide as an additive. 100 parts by weight of a monomer mixture consisting of 75 wt. % of 1,3-butadiene, 10 wt. % of alpha-methylstyrene, and 15 wt. % of biphenylmethyl acrylate, and 0.5 parts by weight of divinylbenzene were added thereto, polymerization was performed at 50° C. for 18 hours, and then 1.0 part by weight of LUPEROX® JWEB50 (manufactured by Arkema, Inc.) was added thereto at the time of a polymerization conversion rate of 95%. Thereafter, the polymerization was terminated at the time of a final polymerization conversion rate of 98% to obtain core latex. In this case, the core particle in the core latex had an average size of 850 Å.

(2) Preparation of Core-Shell Copolymer
67 parts by weight of the obtained core latex (based on solid content) was added to a sealed reactor, nitrogen was filled thereto, and then 0.0094 parts by weight of ethylenedimine tetrasodium acetate, 0.006 parts by weight of ferrous sulfate, and 0.04 parts by weight of sodium formaldehyde sulfoxylate were added thereto. Thereafter, 0.15 parts by weight of potassium oleate, 15 parts by weight of ion-exchanged water, and 0.64 parts by weight of sodium sulfate were added thereto for 10 minutes, and polymerization was performed at 50° C. for 1 hour. Then, 11 parts by weight of methyl methacrylate, 1.1 parts by weight of ethyl acrylate, 10 parts by weight of alpha-methylstyrene, 10.9 parts by weight of biphenylmethyl acrylate, 0.0094 parts by weight of ethylenediamine tetrasodium acetate, 0.006 parts by weight of ferrous sulfate, 0.04 parts by weight of sodium formaldehyde sulfoxylate, 0.15 parts by weight of potassium oleate, and 15 parts by weight of ion-exchanged water were added thereto, and then polymerization was carried out at 50° C. for 2 hours. Thereafter, the polymerization was terminated at the time of a final polymerization conversion rate of 98% to obtain core-shell copolymer latex. In this case, the particle of the core-shell copolymer in the core-shell copolymer latex had an average size of 950 Å.

(3) Preparation of Core-Shell Copolymer Powder
0.5 parts by weight of an antioxidant (IR-245) was added to 100 parts by weight of the obtained core-shell copolymer latex (based on solid content), an aqueous sulfuric acid solution was added thereto to agglomerate, the core-shell copolymer and water were separated at 80° C., and then dehydrated and dried to obtain core-shell copolymer powder.

Examples 2 and 7

Examples 2 to 7 were carried out in the same manner as that in Example 1, except that when the core was prepared, the content of each of butadiene (BD), styrene (SM), divinylbenzene (DVB), alpha-methylstyrene (AMS), and biphenylmethyl acrylate (BPMA) were different, and when the core-shell copolymer was prepared, the content of each of core latex (CORE), methyl methacrylate (MMA), ethyl acrylate (EA), styrene, alpha-methyl styrene, and biphenylmethyl acrylate was different, as shown in Table 1 below. The particle sizes and refractive indexes of the core and the core-shell copolymer were measured as follows and shown in Table 1.

In this case, the particle size was obtained by measuring a weight average particle size using a Nicomp instrument. Specifically, a Nicomp 380 was used to sample 1 g of a latex composition, the sample was diluted and proceeded for 5 minutes at an intensity of 300 KHz, and then the stabilized particle size was measured.

In addition, the refractive index was determined using an Abbe Mark III refractometer (Reichert, Inc.) after 1 g of core latex or core-shell copolymer latex was thinly spread onto a schale with a thickness of 0.1 mm, and dried at 55° C. for 4 hours to form a film type.

TABLE 1

| | | | Examples | | | | | | |
|---|---|---|---|---|---|---|---|---|---|
| | | | 1 | 2 | 3 | 4 | 5 | 6 | 7 |
| Core Content | BD | % by weight | 75 | 75 | 75 | 76 | 69 | 75 | 75 |
| | SM | | 0 | 0 | 0 | 0 | 0 | 0 | 0 |
| | AMS | | 10.0 | 5.0 | 20.0 | 5.0 | 15.0 | 10.0 | 10.0 |
| | BPMA | | 15.0 | 20.0 | 5.0 | 19.0 | 16.0 | 15.0 | 15.0 |
| | DVB | parts by weight | 0.5 | 0.5 | 0.5 | 0.5 | 0.5 | 0.5 | 0.5 |
| Core particle size (Å) | | | 850 | 840 | 830 | 840 | 860 | 800 | 900 |
| Core refractive index | | | 1.5368 | 1.5373 | 1.5358 | 1.5364 | 1.5412 | 1.5368 | 1.5368 |

TABLE 1-continued

| | | | Examples | | | | | | |
|---|---|---|---|---|---|---|---|---|---|
| | | | 1 | 2 | 3 | 4 | 5 | 6 | 7 |
| Core-shell copolymer content | CORE | parts by weight | 67 | 67 | 67 | 70 | 70 | 67 | 67 |
| | MMA | | 11.0 | 11.0 | 11.0 | 10.0 | 11.0 | 11.0 | 11.0 |
| | EA | | 1.1 | 1.1 | 1.1 | 1.1 | 1.1 | 1.1 | 1.1 |
| | SM | | — | — | — | — | — | — | — |
| | AMS | | 10.0 | 5.0 | 15.9 | 5.0 | 12.0 | 10.0 | 10.0 |
| | BPMA | | 10.9 | 15.9 | 5.0 | 14.0 | 5.9 | 10.9 | 10.9 |
| Core-shell copolymer particle size (Å) | | | 950 | 940 | 930 | 940 | 960 | 900 | 1000 |
| Core-shell copolymer refractive index | | | 1.5430 | 1.5438 | 1.5417 | 1.5425 | 1.5440 | 1.5430 | 1.5430 |

COMPARATIVE EXAMPLES

Comparative Examples 1 to 9

Comparative Examples 1 to 9 were carried out in the same manner as that in Example 1, except that when the core was prepared, the content of each of butadiene (BD), styrene (SM), divinylbenzene (DVB), alpha-methylstyrene (AMS), and biphenylmethyl acrylate (BPMA) was different, and when the core-shell copolymer was prepared, the content of each of core latex (CORE), methyl methacrylate (MMA), ethyl acrylate (EA), styrene, alpha-methyl styrene, and biphenylmethyl acrylate was different, as shown in Table 2 below.

TABLE 2

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Core Content | BD | % by weight | 75 | 75 | 75 | 75 | 75 | 75 | 75 | 77 | 68 |
| | SM | | 25 | 5 | 10 | 0 | 0 | 0 | 0 | 0 | 0 |
| | AMS | | — | 20.0 | 0.0 | 3.0 | 22.0 | 10.0 | 10.0 | 13.0 | 5.0 |
| | BPMA | | — | 0.0 | 15.0 | 22.0 | 3.0 | 15.0 | 15.0 | 10.0 | 27.0 |
| | DVB | parts by weight | 1.0 | 1.0 | 0.5 | 0.5 | 0.5 | 0.5 | 0.5 | 0.5 | 0.5 |
| Core particle size (Å) | | | 750 | 850 | 850 | 850 | 850 | 750 | 950 | 850 | 850 |
| Core refractive index | | | 1.5350 | 1.5353 | 1.5367 | 1.5352 | 1.5345 | 1.5368 | 1.5368 | 1.5348 | 1.5431 |
| Core-shell copolymer content | CORE | parts by weight | 67 | 67 | 67 | 67 | 67 | 67 | 67 | 70 | 70 |
| | MMA | | 12.0 | 11.0 | 11.0 | 11.0 | 11.0 | 11.0 | 11.0 | 11.0 | 11.0 |
| | EA | | 1.5 | 1.1 | 1.1 | 1.1 | 1.1 | 1.1 | 1.1 | 1.1 | 1.1 |
| | SM | | 19.5 | — | — | 5.0 | — | — | — | — | — |
| | AMS | | — | 20.9 | — | 3.0 | 17.1 | 10.0 | 10.0 | 12.9 | 9.0 |
| | BPMA | | — | 0.0 | 20.9 | 12.9 | 3.8 | 10.9 | 10.9 | 5.0 | 8.9 |
| Core-shell copolymer particle size (Å) | | | 850 | 950 | 950 | 950 | 950 | 850 | 1050 | 950 | 850 |
| Core-shell copolymer refractive index | | | 1.5390 | 1.5409 | 1.5439 | 1.5405 | 1.5410 | 1.5430 | 1.5430 | 1.5394 | 1.5456 |

EXPERIMENTAL EXAMPLE

In order to evaluate the physical properties of the resin composition comprising the core-shell copolymer prepared in Examples 1 to 7 and Comparative Examples 1 to 9 as an impact modifier, specimens were prepared as follows. The physical properties of the specimens were measured by the following methods and are shown in Tables 3 and 4 below.

1) Preparation of Resin Composition Specimen 100 parts by weight of the vinyl chloride polymer (manufactured by LG Chem. Ltd., product name LS080), 1.5 parts by weight of a heat stabilizer (tin stearate), 1.0 part by weight of an internal lubricant (potassium stearate), 0.3 parts by weight of an external lubricant (paraffin wax), 0.5 parts by weight of a processing aid (manufactured by LG Chem. Ltd., product name PA-910), and 0.5 parts by weight of a pigment were sufficiently mixed at a temperature of 130° C. using a high-speed stirrer, and then cooled to prepare a vinyl chloride polymer master batch. 7 parts by weight of each of the core-shell copolymer powder prepared in Examples 1 to 7 and Comparative Examples 1 to 9 was added to the prepared vinyl chloride polymer master batch, and a sheet having a thickness of 0.6 mm was measured using a two-roll mill at 195° C.

2) Swell Index

Only the core portion was taken from the core-shell copolymers prepared in Examples 1 to 7 and Comparative Examples 1 to 9 and immersed in toluene for 24 hours. Subsequently, the swelling index was measured by the following Equation 1. In this case, the lower the swell index, the better the crosslinking degree.

[Equation 1]

Swell index=weight in state of being swollen in toluene/weight after drying toluene 3) Impact Strength For the prepared resin composition specimen, Izod impact strength was measured according to ASTM D256.

4) Transparency

The prepared resin composition specimen having a thickness of 0.6 mm was cut into a size of 10 cm (width)×14 cm (length), and transmittance and haze were measured using a haze meter (Suga Ltd.) device.

5) Haze Property

The prepared resin composition specimen having a thickness of 0.6 mm was cut into a size of 20 cm (width)×3 cm (length) and stretched by 2 cm using a tensile machine Z010 (Zwick GmbH), and then the haze of the tensioned portion was measured using a haze meter device (Suga Ltd.). In this case, the smaller the haze value, the better the haze property.

6) Thermal Stability

When the resin composition specimen was manufactured, 20 parts by weight of the core-shell copolymer powder was added to the prepared master batch, kneaded at room temperature, and then processed for 10 minutes at 195° C. using a two-roll mill, under the condition of a roll gap of 0.3 mm to evaluate a thermal stability. The yellowness index (YI) value was measured using an Ultra Scan pro, which is a color measuring instrument, and ΔYI was calculated and shown according to the following Equation 2.

[Equation 2]

ΔYI=YI value of specimen processed for 10 minutes−YI value of specimen processed for 3 minutes.

7) Fish Eye Property 8 g of each powder was added to 100 g of the prepared resin composition specimen containing 50 wt. % of di-2-ethylhexyl phthalate (DOP), and mixed at a temperature of 175° C. for 90 seconds to manufacture a specimen having a thickness of 0.4 mm, a width of 15 cm, and a length of 15 cm. The number of fish eyes was observed visually and evaluated based on the following criteria.

<Evaluation Criteria>

5 points: In a case where the number of fish eyes per specimen (15×15) cm$^2$ is 5 or less.

4 points: In a case where the number of fish eyes per specimen (15×15) cm$^2$ is 10 to 20.

3 points: In a case where the number of fish eyes per specimen (15×15) cm$^2$ is 21 to 30.

2 points: In a case where the number of fish eyes per specimen (15×15) cm$^2$ is 31 to 40.

1 point: In a case where the number of fish eyes per specimen (15×15) cm$^2$ is 41 to 50.

TABLE 3

| | | Examples | | | | | | |
|---|---|---|---|---|---|---|---|---|
| | | 1 | 2 | 3 | 4 | 5 | 6 | 7 |
| Crosslinking degree | Swell index | 10.0 | 9.5 | 10.5 | 9.6 | 9.7 | 10.0 | 9.7 |
| Fish eye property | 5-point method | 5 | 5 | 5 | 5 | 5 | 5 | 5 |
| Transparency | (%) | 92.0 | 92.0 | 92.0 | 92.2 | 92.1 | 92.5 | 91.5 |
| | Haze (%) | 0.7 | 0.6 | 0.8 | 0.7 | 0.6 | 0.6 | 0.7 |
| Haze property | (%) | 9.0 | 9.5 | 9.8 | 8.9 | 9.5 | 8.5 | 9.7 |
| Thermal stability | ΔYI | 12.0 | 17.0 | 10.0 | 15.0 | 11.0 | 11.8 | 12.3 |
| Impact strength | Kgf/cm$^2$ | 9.0 | 8.8 | 9.3 | 9.1 | 8.9 | 8.7 | 9.3 |

TABLE 4

| | | Comparative Examples | | | | | | | | |
|---|---|---|---|---|---|---|---|---|---|---|
| | | 1 | 2 | 3 | 4 | 5 | 6 | 7 | 8 | 9 |
| Crosslinking degree | Swell index | 10.0 | 10.1 | 9.7 | 9.8 | 12.0 | 9.9 | 9.9 | 9.8 | 9.9 |
| Fish eye property | 5-point method | 5 | 5 | 5 | 5 | 5 | 5 | 5 | 5 | 5 |
| Transparency | (%) | 90.0 | 90.0 | 92.0 | 92.0 | 90.5 | 92.0 | 90.2 | 90.2 | 90.3 |
| | Haze (%) | 1.0 | 1.0 | 0.6 | 0.7 | 0.9 | 0.5 | 1.0 | 1.0 | 1.0 |
| Haze property | (%) | 10.0 | 10.1 | 9.7 | 9.8 | 14.0 | 8.8 | 10.5 | 9.0 | 10.0 |
| Thermal stability | ΔYI | 35.0 | 22.0 | 30.0 | 28.0 | 19.0 | 11.7 | 11.5 | 13.0 | 12.5 |
| Impact strength | Kgf/cm$^2$ | 8.0 | 8.1 | 8.5 | 8.8 | 9.7 | 8.1 | 9.2 | 9.1 | 8.4 |

As shown in Tables 3 and 4, it could be confirmed that the resin composition comprising the core-shell copolymer of Examples 1 to 7 prepared according to the present invention as an impact modifier, had improved transparency, thermal stability, and impact strength as compared to Comparative Example 1 in which neither alpha-methylstyrene nor biphenylmethyl acrylate was used.

In addition, it could be found that in Comparative Example 2 in which alpha-methylstyrene was used alone, the thermal stability was slightly improved as compared to Comparative Example 1, but other physical properties were reduced as compared to Examples 1 to 7.

In addition, it could be found that in Comparative Example 3 in which biphenylmethyl acrylate was used alone, the transparency was implemented at the same level, but the thermal stability was reduced as compared to Examples 1 to 7.

Further, it could be found that in Comparative Example 4 in which both alpha-methylstyrene and biphenylmethyl acrylate were used, but the content of alpha-methylstyrene was lower than that of the alpha-methylstyrene according to the present invention, the transparency was implemented at the same level, but the thermal stability was reduced as compared to Examples 1 to 7.

Further, it could be confirmed that in Comparative Example 5 in which both alpha-methyl styrene and biphenylmethyl acrylate were used, but the content of biphenylmethyl acrylate was lower than that of the biphenylmethyl acrylate according to the present invention, the impact strength was implemented at the same level, but the transparency and haze property were reduced as compared to Examples 1 to 7.

Further, it could be found that in Comparative Example 6 in which the particle size of the core and the particle size of the core-shell copolymer were smaller than those of the core and the core-shell copolymer according to the present invention, the transparency and thermal stability were implemented at the same level, but the impact strength was reduced as compared to Examples 1 to 7.

Further, it could be found that in Comparative Example 7 in which the particle size of the core and the particle size of the core-shell copolymer were larger than those of the core and the core-shell copolymer according to the present invention, the impact strength and thermal stability were implemented at the same level, but the transparency was reduced as compared to Examples 1 to 7.

Furthermore, it could be found that in Comparative Example 8 in which the refractive index of the core and the refractive index of the core-shell copolymer were lower than those of the core and the core-shell copolymer according to the present invention, the impact strength and thermal stability were implemented at the same level, but the transparency was reduced as compared to Examples 1 to 7.

Furthermore, it could be found that in Comparative Example 9 in which the refractive index of the core and the refractive index of the core-shell copolymer were higher than those of the core and the core-shell copolymer according to the present invention, the thermal stability was implemented at the same level, but the transparency and impact strength were reduced as compared to Examples 1 to 7.

The invention claimed is:

1. A core-shell copolymer, comprising a core and a shell surrounding the core,
    wherein the core includes a conjugated diene monomer-derived repeating unit, an aromatic vinyl monomer-derived repeating unit, and an aromatic (meth)acrylate monomer-derived repeating unit,
    the shell includes an alkyl (meth)acrylate monomer-derived repeating unit, an aromatic vinyl monomer-derived repeating unit, and an aromatic (meth)acrylate monomer-derived repeating unit,
    the core has a particle size of 800 Å to 900 Å,
    the core-shell copolymer has a particle size of 900 Å to 1000 Å,
    the core has a refractive index of 1.5355 to 1.5425, and
    the core-shell copolymer has a refractive index of 1.5415 to 1.5440.

2. The core-shell copolymer of claim 1, wherein a content of the aromatic vinyl monomer-derived repeating unit included in the core is 4 parts by weight to 20 parts by weight based on 100 parts by weight of the total core.

3. The core-shell copolymer of claim 1, wherein a content of the aromatic (meth)acrylate monomer-derived repeating unit included in the core is 4 parts by weight to 27 parts by weight based on 100 parts by weight of the total core.

4. The core-shell copolymer of claim 1, wherein a weight ratio of the aromatic vinyl monomer-derived repeating unit and the aromatic (meth)acrylate monomer-derived repeating unit included in the core is 1:0.2 to 1:5.

5. The core-shell copolymer of claim 1, wherein a content of the aromatic vinyl monomer-derived repeating unit included in the shell is 5 parts by weight to 20 parts by weight based on 100 parts by weight of the total core-shell copolymer.

6. The core-shell copolymer of claim 1, wherein a content of the aromatic (meth)acrylate monomer-derived repeating unit included in the shell is 5 parts by weight to 20 parts by weight based on 100 parts by weight of the total core-shell copolymer.

7. The core-shell copolymer of claim 1, wherein a weight ratio of the aromatic vinyl monomer-derived repeating unit and the aromatic (meth)acrylate monomer-derived repeating unit included in the shell is 1:0.25 to 1:3.5.

8. A resin composition comprising the core-shell copolymer of claim 1 and a vinyl chloride polymer.

* * * * *